United States Patent [19]

Aung et al.

[11] Patent Number: 5,338,558

[45] Date of Patent: * Aug. 16, 1994

[54] PROCESS FOR PREPARING STABILIZED, PARTIALLY-DEHYDRATED AROMATIC PLANT PRODUCTS

[75] Inventors: Thein Aung; Charles V. Fulger, both of Cockeysville, Md.

[73] Assignee: McCormick & Company, Inc., Sparks, Md.

[*] Notice: The portion of the term of this patent subsequent to Jul. 13, 2010 has been disclaimed.

[21] Appl. No.: 988,191

[22] Filed: Dec. 9, 1992

[51] Int. Cl.$^5$ .................. A23L 1/221; A23B 7/08
[52] U.S. Cl. ..................... 426/327; 426/321; 426/638; 426/639
[58] Field of Search ............... 426/638, 639, 321, 327

[56] References Cited

U.S. PATENT DOCUMENTS

| | | | |
|---|---|---|---|
| 3,219,461 | 11/1965 | Lamb . | |
| 4,390,550 | 6/1983 | Kahn et al. . | |
| 4,447,460 | 5/1984 | Lewis et al. | 426/541 |
| 4,478,868 | 10/1984 | Ariss et al. . | |
| 4,572,836 | 2/1986 | Bakal | 426/321 |
| 4,683,141 | 7/1987 | Lewis et al. | 426/640 X |
| 4,832,969 | 5/1989 | Lioutas | 426/324 X |
| 5,073,400 | 12/1991 | Bruno et al. . | |
| 5,093,145 | 3/1992 | Darbonne et al. | 426/638 X |
| 5,227,183 | 7/1993 | Aung et al. | 426/638 X |

FOREIGN PATENT DOCUMENTS

| | | |
|---|---|---|
| 0285235 | 10/1988 | European Pat. Off. . |
| 0382656 | 8/1990 | European Pat. Off. ............ 426/638 |
| 2014429A | 8/1979 | United Kingdom . |
| 2225521 | 6/1990 | United Kingdom . |

*Primary Examiner*—Joseph Golian
*Attorney, Agent, or Firm*—Oblon, Spivak, McClelland, Maier & Neustadt

[57] ABSTRACT

A frozen, stabilized herb having a water activity coefficient of from 0.30 to 0.97 and comprising an infused osmotic agent.

16 Claims, 1 Drawing Sheet

PROCESS FOR PREPARING STABILIZED, PARTIALLY-DEHYDRATED AROMATIC PLANT PRODUCTS

TECHNICAL FIELD

The invention generally relates to stabilized, partially-dehydrated aromatic herbs which exhibit the color, flavor aroma and overall appearance comparable to that of the freshly-chopped plant and the methods for their preparation.

BACKGROUND OF THE INVENTION

In the frozen food field, attempts have been made to package fresh, edible plant products, such as herb, fresh fruit and fresh vegetable products so that the desirable qualities of the fresh products are maintained. In particular, the art has recognized the desirability of preparing a product that would maintain quality, flowability and easy handling characteristics for long periods of time at frozen temperatures as well as when the product is repeatedly thawed and refrozen or when the product is left in a refrigerated state (approximately 40° F. or about 4°-5° C.) for several days or longer. In particular, the art has recognized the desirability of preparing a product that would maintain quality, consistent supply, easy handling characteristics and portion control year round thus enabling food producers, food merchants, or restaurants to stock such product, in particular, the aromatic products for sale to consumers while reducing losses due to spoilage, waste or deterioration. Since many of the edible plant products including herbs, fruits and vegetables valued for use in foods are, for climatic reasons, generally only available regionally and/or seasonally, the art has recognized a need for products that could be pre-processed to eliminate waste, stored in a frozen state to preserve fresh flavor, color and overall appearance, and also maintain flowability and ease of handling in the frozen state.

In many of these products some of the properties that cause consumers to value the fresh character of these food products are difficult to maintain for extended periods. This problem is especially acute with fresh leafy plants which often may contain their flavor and aroma components in discrete oil or flavor glands. Such plants are typically classified as herbs, sometimes more particularly as aromatic herbs. Accordingly, it would be desirable to preserve the color, flavor, aroma and overall natural or comminuted appearance of fresh herbs without resorting to chemical additives, special types of packaging or packaging equipment while providing an extended shelf-life for the packaged product. The technique of freezing plant products has been utilized for many years as a method of preserving fresh character, flavor and appearance. However, inherent enzymatic activity in biological materials which is somewhat active in the frozen state and upon thawing can lead to severe degradation of flavor, color and appearance. To overcome this problem, the plant material is usually blanched to inactivate enzymes prior to further processing and preservation by freezing. Blanching in water partially cooks the product which can lead to loss of fresh flavor and appearance. Attempts have been made to maintain fresh appearance by adding components to the blanched product such as sugars, salt and food acids.

Blanching herbs results in a substantial loss of the flavor and aroma components. Accordingly several approaches have been adopted to avoid blanching. Most of these involve the use of oils, salts, acids and the like coupled with freezing. These techniques suffer from several serious deficiencies. The above additives may cause flavor, color and texture changes as well as causing undesirable ingredients to be added to the ingredient declaration. Also, to achieve a free flowing product, the expensive individual quick freezing technology (IQF) must be used. While IQF technology provides an initially free-flowing product, the product will lose its free-flowing characteristics when thawed and refrozen. Techniques using oils such as olive oil impart their own characteristic flavor to the product. Another deficiency is that the products generally do not have good integrity upon thawing; that is, the herb pieces tend to disintegrate upon use thereby losing their desirable visual impact. Also, some of these techniques result in undesirable color changes which precludes the use of such products where it is desired to use the herbs to achieve a visual impact. Lack of piece identity and product color changes also create an undesirable consumer reaction if the products are sold in transparent containers and upon use.

The prior art contains numerous descriptions of processes for preparing frozen food or preserved food products using sugar, see for instance U.S Pat. Nos. 5,110,609, 5,073,400, 4,478,868, 4,447,460, 4,390,550, 3,219,461 and U.K. patent 2,225,521. However, none of these processes are concerned with the unique problems encountered in freezing herbs. U.S. Pat. No. 5,093,145 teaches a process for processing herbs using chemical enzyme-blocking agents, but it does not provide a product having freeze-thaw stability and, in particular, free-flowing properties.

Techniques to solve the foregoing problems by preserving herbs by improved dehydration techniques have not been successful. EP 285,235 describes a dehydrated herb product containing glycerol which retains most of the color and flavor of fresh herbs. Unfortunately, the product has an atypical surface texture, limited ambient shelf life, an excessive sweetness, and upon long term storage, separation of the glycerol from the herbs occurs. Also, because glycerol is a chemical additive, the product cannot be marketed or sold as free of artificial ingredients. A technique which overcomes the deficiencies in EP 285,235 is described in our application S.N. WO 9210946, filed Jul. 9, 1992. This technique produces a dehydrated herb having superior organoleptic properties to ordinary dehydrated herbs. The process of S.N. WO 9210946 comprises a combination infusion, osmotic dehydrating and blanching step using an osmotic solution containing an osmotic agent which infuses into and osmotically dehydrates the herb. The infused product is then dried to a low moisture level, typically below 6% moisture to form an amorphous coating which encapsulates the oil sacs or glands, and the dehydrated product recovered. However, a need continues to exist closer to fresh herbs than can be achieved by the process of S.N. for a preserved herb product having organoleptic properties closer to fresh herbs than can be achieved by the process of S.N. WO 9210946.

A need also exists for a frozen herd product which retains the structural integrity, color and organoleptic properties of fresh herbs. A need, in particular, exists for a frozen herb product which is free-flowing even after undergoing freeze-thaw cycles.

SUMMARY OF THE INVENTION

An object of the present invention is to provide a method of preparing and using treated fresh aromatic plant products so as to preserve the desirable qualities found in such fresh products while extending their useful shelf-life and the compositions thereof.

A further object of the present invention is to provide a method of preparing and using stabilized, frozen or refrigerated aromatic plant products which will exhibit the sensory properties of color, flavor, aroma and overall appearance comparable to that of fresh cut plant products.

Another object of this invention is to provide novel, stabilized, frozen or refrigerated aromatic plant products which provide a product having the sensory properties of fresh cut edible plant products.

Yet another object of the present invention is to provide frozen or refrigerated stabilized herb products free from the adverse effects of enzymatic degradation including browning and loss of flavor and aromatic properties.

These and other objects of this invention which will become apparent from the following disclosure have been obtained by partially dehydrating the plant material at an elevated temperature with a solution of an osmotic agent which is capable of infusion into the plant tissue. The inherent enzymes of the plant are inactivated in the infused plant product by the heat and osmotic agents used in the blanching in order to preserve color and flavor. The infused product is then frozen. The resultant frozen product is free-flowing, easy to handle and exhibits characteristics of the flavor, color and appearance attributes of the fresh herb. In a further embodiment of this technique, the plant material is first washed in an initial liquid bath and then subjected to the infusion process followed by optional, partial-drying as required.

Additional objects and advantages of the present invention are apparent from the following description.

BRIEF DESCRIPTION OF THE DRAWINGS

DRAWING 1 is a block-type flow chart setting forth a preferred method of the present invention as applied to the treatment of herbs and for forming the product of that method.

DETAILED DESCRIPTION OF THE PREFERRED EMBODIMENTS

Figure 1:
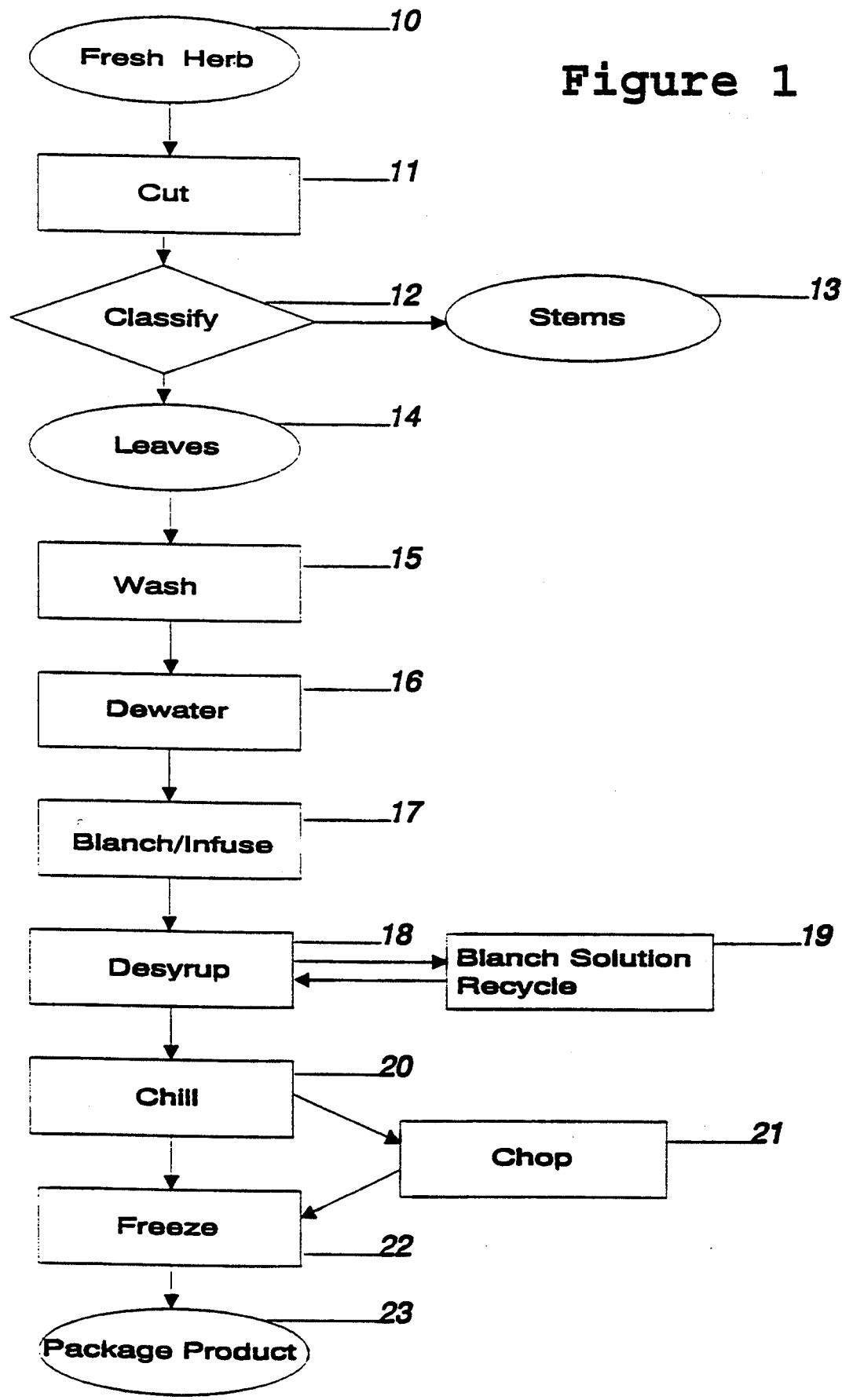

The term 'aromatic plant' is used to denote those plants having specialized tissues which contain aromatic components possessing strong flavor and aroma. Such aromatic plants include herbs such as basil, parsley, oregano, dill, cilantro, sage and the like, many of which are characterized by oil sacs or glands which contain the flavor and aroma values of the plant. Aromatic plants such as herbs are prized primarily for their appearance, texture, flavor and aroma. In these plants, enzymatic action cause a rapid deterioration in color and aroma.

The present process comprises dehydrating and infusing the aromatic plant with an osmotic solution under conventional blanching conditions, optional further partial drying, followed by freezing to produce a product which is free-flowing and non-crystalline. Any osmotic agent can be used in the process. Preferred osmotic agents would possess high water solubility, preferably sufficient solubility to form a solution containing at least 20% by weight (all percentages (%) recited in this application are "by weight" unless otherwise indicated) of osmotic agent up to the maximum solubility of osmotic agent in the solvent. From practical solubility and viscosity considerations, the content of osmotic agent does not usually exceed 70%, preferably at least 20% and more preferably from 35 to 65% by weight and most preferably 50-60 wt. % in the infusion solution. The preferred solvent used to form the osmotic solution is water but can be any other food-grade solvent which does not adversely affect the flavor and aroma components. Preferably the solvent does not introduce any flavor components into the finished product. The osmotic agent preferably has a low molecular weight to create high osmotic pressure sufficient to cause moisture to migrate from the plant to the osmotic solution. suitable osmotic agents include monosaccharides, disaccharides, their derivative products and mixtures thereof, such as, corn syrups with high dextrose equivalent (D.E.). While low molecular weight polyalcohols can be used, they are not preferred because the resulting product cannot be labelled as free of artificial ingredients. Also the low molecular weight polyalcohols tend to separate from the product under refrigerator conditions. Preferred osmotic agents are high fructose corn syrup (HFCS), fructose, glucose, sucrose, maltose, and hydrogenated corn syrup. More preferred are corn syrup having a D.E. above about 62, glucose, fructose, sucrose and/or mixtures thereof. The most preferred osmotic agent is HFCS.

High molecular weight sugars such as corn syrup having a D.E. below about 62, such as commercially available corn syrup having a D.E. of about 42, do not infuse well into the leaf and require extended infusion times. Further, the higher molecular weight sugars result in a product after the infusion step which is sticky, clumps and forms a large, fused mass.

The temperature conditions under which infusion with humectant solution occurs must be sufficient to blanch the plant. If the temperature is too low, the plant discolors and loses much of its fresh aroma and develops undesirable flavor. Conventional blanching conditions have been found suitable. Preferably, the osmotic solution is maintained at a temperature high enough to prevent subsequent enzymatic action, more preferably above 180° F. The maximum temperature is limited generally by the boiling point of the osmotic solution at atmospheric conditions. The boiling point of the osmotic solution can be increased by performing the process under pressure, however it is preferred to use ambient pressures. The preferred blanching temperature is from about 180°-225° F. It is necessary that the blanching occur in the osmotic solution. If a separate blanching step is used in hot water or steam, the flavor and aroma of the aromatic plant are lost. It is possible to use multiple osmotic solutions in sequence, however, no advantage occurs over the use of a single infusion step.

The infusion time needs to be long enough only to ensure both blanching and infusion. Excessive infusion times which cause degradation of the aromatic plant should be avoided. Times on the order of a few seconds to minutes are suitable, preferably from about 20-30 seconds to about 5 minutes. In commercial size facilities, longer infusion times may occur because of delays in material handling of large batches. Such delays may not adversely affect the product.

The product is rapidly cooled after blanching to remove the heat of blanching. The product then may be chopped to a final desired size. The chopping conditions should be performed following blanching and cooling in order to eliminate excessive bruising of the product. The size reduction is determined by the end-use of the product and the product handling requirements for the food processor. However, the size reduction can be performed before blanching and infusion if desired.

The freezing conditions should be such that the temperature of the blanched, chopped product can be rapidly reduced to commercial freezing conditions to eliminate any degradation to the product due to prolonged exposure to heat. This can be accomplished by any means necessary such as spreading the product in thin layers on trays and then placing in an appropriate freezer or by 'quick-freezing' in liquid nitrogen and the like. Any conventional freezing process which prevents degradation can be employed.

Prior to subjecting the aromatic plant to the infusion step, one may wash the plant to remove dirt, debris and other extraneous matter which increase the microbial content of the herb. Such washing may comprise spraying the plants with or immersing them in water, a water-detergent, or water-wetting agent mixture to remove such dirt, etc. If a detergent or other wetting agent is used, the plants should be rinsed to remove residual detergent/wetting agent. Excess water from the washing step should be removed. The removal can be by simply draining, with air, vacuum, or centrifuging.

The washing step followed by the hot infusion of the present process with optional, partial-drying produces a product which has a low microbial load and a water activity ($A_w$) of about 0.3 to 0.97 which does not need further sterilization. The product has a shelf-life of several months to at least one year as long as it is kept frozen. At a water activity of 0.55 to 0.85, the product has a shelf-life of at least two to three weeks at normal refrigerator temperatures. The shelf-life at refrigerator temperatures is extended from several weeks to several months when the water activity is held below 0.55. Indeed, at a $A_w$ of 0.3 to 0.4, the product should have an extended shelf-life even at ambient temperatures. The product is characterized as being of leafy plant origin, free-flowing, dark green in color with a moisture content of from 6–75% by weight. The preferred product of this invention is characterized as herb having been blanched and infused with a solution containing between 40–70% of a low molecular weight carbohydrate. In a particularly preferred embodiment the product comprises less than 75% by weight of water, and most preferably from 25–60% water. Product with $A_w$ contents from about 0.80 to 0.97 can be obtained solely by osmotic drying in high fructose corn syrup solutions. For products with lower $A_w$ coefficients, it is necessary to subject the product to an additional drying step after the blanching and infusion step or one must use a different osmotic agent in the blanching/infusion step which is capable of providing a product with the desired $A_w$ coefficient.

The size of the plants to be treated by the present process is not critical but does determine the time for infusion. Thus it may be desirable to reduce the plants to a size which facilitates infusion. If desired, the leaves can be separated from the plant and the whole leaf can be treated but, commercially it may be preferred to de-stem and chop the leaf to speed infusion.

The preferred mode of the present invention comprises the steps of: (a) washing the product with a first liquid bath; (b) removing excess surface liquid of the first bath; (c) blanching/dehydrating/infusing the product by immersing in a second liquid bath containing a substantial quantity of an osmotic agent; (d) optionally removing excess surface liquid of the second bath; (e) preferably cooling or chilling the product to remove heat from blanching; (f) optionally chopping the product to a uniform size; and (g) freezing the product.

A more preferred aspect of the present invention comprises the steps of: (a) washing the product with a first liquid bath; (b) removing excess surface liquid of the first bath; (c) blanching/dehydrating/infusing the product by immersing in a second liquid bath containing from about 20% to about 70% of the osmotic agent solids for a time of from about 1.5 minutes to about 5 minutes to a product final moisture content of from about 30–75% (d) optionally removing excess surface liquid of the second bath; (e) preferably cooling or chilling the product; (f) optionally chopping the product to a desirable size; (g) optionally partially dehydrating the product; and (h) freezing the product.

As noted above, the present invention relates to a method for preparing a frozen, partially dehydrated herb as well as the product of such methods which exhibits the color, flavor, aroma and overall appearance comparable to freshly chopped herbs. Generally the process comprises the steps of preparing the raw material by washing, dewatering, treating the raw material with an osmotic agent, removing excess surface liquid, chopping and freezing.

Although the process can be carried out in batch form, it is preferred that the process be substantially continuous so that, as is customary in production facilities, the speed of the throughput conveyors will be set to accommodate the step in the process requiring the greatest dwell time. In handling of freshly harvested plants, it will be appreciated by those skilled in the art that for different plants, different specific treatment parameters throughout the steps of the process may be required.

The present invention is applicable and useful with a wide variety of aromatic plant products. It is particularly applicable to preservation of aromatic herbs, as such products when freshly cut must reach the market within approximately three days add exhibit a shelf-life of only approximately seven days. It is not uncommon for many leafy herbs to lose much of their desired flavor and color in a matter of days.

Typical aromatic plants which can be treated include, but are not limited to basil, dill weed, parsley, oregano, marjoram, sage, thyme, rosemary, mint, cilantro, tarragon, chervil, mint and genetic variations of various herbs. Examples of genetic variations would include lemon basil, cinnamon basil, purple basil and so forth. It is also contemplated that leafy herbs such as lemon grass and other grassy herbs may be treated with the process disclosed herein. A preferred group of herbs for use in conjunction with the present invention are basil, cilantro, dill weed, parsley, sage and oregano.

Fresh herb is harvested and preferably kept cool prior to processing to prevent enzymatic degradation. In carrying out the disclosed method of treatment, it may be desirable that the freshly harvested herbs (10, as shown in FIG. 1) are first cut to a uniform size (11). Cutting the herb into a more uniform size would simplify further handling of the product. Cutting may be accomplished by any acceptable manner known to those skilled in the art. For example, gentle strip-cutting

(11) of the whole fresh herb into pieces ranging in size from one-quarter inch to one inch may be carried out using an Urschel cutter. However, if whole leaves are desirable whole leaves can be processed.

The leaves (14) then may be separated from the stems (13) by a classification process (12). This may be desirable if stems and other non-leaf portions of the plant cause problems with further processing or are detrimental to the final product. Again any effective means of separation may be used; one preferred system is a Key air classifier. To some extent effective leaf/stem separation is dependent upon obtaining fresh raw material (not wilted) that is free from surface water. The stem-free product (14) is then ready to be washed (15).

Again any means that are effective for removing field dirt, sand, pesticides and also reduces the microbial load may be employed. In the preferred continuous process, the stem-free product is taken from the above supply located upstream of a conveyor which at its discharge end drops the herb product into a washer equipped with a bank of spray nozzles to agitate and wet the leaves. The nozzles are preferably fed with chilled water at approximately 40° F. from any acceptable feeding means. The leaves are conveyed via paddles through the washer where the leaves are thoroughly washed. The washing station may employ a deep tank for submerging the product for treatment instead of just spraying or a combination of spraying and submersion may be used. Preferably the product is immersed in a bath containing an ambient temperature or a slightly chilled food-grade detergent solution. The detergent solution is circulated through the bath as well as sprayed from the above-mentioned nozzles at the top of the bath at high velocity for agitation of the leaves.

The washed leaves are then conveyed on a vibrating conveyor and sprayed with ambient water to rinse away the detergent. Excess surface water is then removed from the leaves using any conventional means. Such means will be familiar to those skilled in the art and include a variety of methods such as vibration over a screen and/or vacuum aspiration, pressing, and by use of high power jets of air. However, a preferred method is by centrifugation (16). The leaves are loaded manually into a centrifuge basket and then the centrifuge is accelerated up to a maximum of 350 G for approximately 2 minutes. This method removes greater than 90% of the surface water with minimum damage to the herbs. Alternately, to make the process more continuous, the leaves can be dewatered by a pressing perforated conveyor and the like.

The next step in the treatment of the herb is immersion (17) of the cleaned, dried herb in a hypertonic solution which substantially coats, infuses into and osmotically dehydrates the herb product at a temperature sufficient to blanch the herb. Although the osmotic agent may be added to the herb by various well known means, FIG. 1 sets forth a recycling loop/procedure (19) for reusing the osmotic agent. This procedure is preferred for treating the herbs. Recycling of the osmotic agent has economic benefits.

By hypertonic solution, it is meant a solution that has a sufficient osmotic pressure such that moisture migrates rapidly from the herb to the bath solution. The osmotic agent used must be able to infuse and dehydrate the herb being treated. Osmotic agents used in the hypertonic infusing or blanching solution can be chosen from a group or organic materials which have high water solubility and are of sufficiently low molecular weight to create high osmotic pressure discussed previously. The most preferable agents for this purpose are HFCS, glucose, sucrose and/or mixtures thereof. To some degree the choice of the osmotic agent depends on its cost and commercial availability.

Organic materials which do not have sufficient solubility or have a large molecular weight do not facilitate osmotic dehydration and are not singly usable for this process, however they may be used as a secondary component of the osmotically dehydrated herb. Examples of carbohydrates and polyalcohols that may be added may include partially hydrolyzed starch, maltodextrin, sorbitol and maltitol. While inorganic salts such as sodium chloride and calcium chloride have excellent osmotic dehydration properties, their strong flavor would limit their use in this invention and could not be used alone for this process. However, it is contemplated that osmotic agents could be used in combination with other components to obtain different flavors and textures.

Polyols such as sorbitol and maltitol which are also osmotic agents could be used in this process either alone or in admixture with the osmotic agents described above and can be used to produce acceptable finished products. Polyols such as glycerol and propylene glycol would produce a product which has a softer texture in the frozen state. Mixtures of glycerol and sorbitol can be used to achieve low water activities without the need for an additional drying step subsequent to the blanching/infusion step. However, such osmotic agents are not preferred or desired in view of the fact that such materials are considered to be an artificial food ingredient and they also impart a strong, undesirable flavor to the finished product. In addition, the use of mixtures of osmotic agents can present processing problems as a result of differences in infusion properties. If it is desired to modify the texture of the frozen herbs, it is preferred that the agents to accomplish same be separately applied to the herb after conclusion of the infusion step. Such materials could be added by spraying the agents onto the herbs or by immersing the herbs in solutions containing the agents.

Although it is possible to use a broad range of osmotic agent solids in the present invention, in order to achieve acceptable finished product quality, the infusing/blanching solution should contain at least 10%, preferably contain about 20% dissolved osmotic agent solids and may contain up to the maximum amount of osmotic agent solids which can be effectively utilized. Commercially available HFCS's are available with dissolved solids up to about 70%.

A more preferred range is from about 40% to about 70%. The most preferable solids concentration in the infusion/blanching solution is from about 50% to about 70%. When the osmotic solution is recycled, its concentration can be restored to the desired level, by adding high concentration sugar syrup or dry sugar, to the recycled solution.

Osmotic dehydration selectively removes the water from the herb while concentrating and retaining the flavor components. Osmotic dehydration is directly related to the concentration of the dissolved particles, therefore increasing the concentration of the osmotic agent increases flavor strength and decreases the moisture content of the infused/blanched herb.

The infusion temperature may vary from about 180° F. to about 225° F. A more preferred range is from about 190° F. to about 210° F. The infusion or blanching solution should be of sufficient volume and temperature to instantly bring the temperature of the fresh herb leaves above about 180° F. Therefore, for example, the ratio of infusion or blanching solution to herb must be minimally about 7.5:1 at 200° F. to maintain these parameters. More preferably, the ratio of infusion or blanching solution to herb should be at least 10:1 at 200° F. The amount of time that the material is infused/blanched will vary from product to product. The present invention contemplates a time period that is effective in dehydrating and infusing the herb product. A preferred infusing/blanching time should be at least 1.5 minutes at 200° F. and may be up to 10 minutes or longer if lower temperatures are utilized. A more preferred range would be from about 2 minutes to about 5 minutes at 200° F. for herbs. Most preferably, the infusing/blanching time for herbs should be about 2 minutes to about 2.5 minutes as this results in inhibition of browning and maintenance of desirable flavor. This time period also results in the blanched product moisture content approaching equilibrium with the blanching solution. Blanching herbs at temperatures below 180° F. for longer time periods up to 5 minutes results in excessive flavor loss and does not make an acceptable finished product. Following infusion/blanching, excess surface blanching solution may be removed (18) from the blanched leaves by means such as gravitational draining, centrifugation, pressing or other available methods which do not damage the leaf structure. Equipment and procedures similar to those used for the previous dewatering steps could be used. The force used should be sufficient to remove most of surface syrup solution but not so excessive as to damage the leaves or to compact the leaves into clumps which cannot be broken up and frozen. Minor clumping can be eliminated by passing the product through a mill.

The freshly blanched material is optionally further dehydrated with hot turbulent air, and then optimally is chilled (20) rapidly to remove heat from the product. The maintenance of heat from blanching the product may lead to degradation of the final product. Chilling also reduces the pliability of the leaves which facilitates chopping the product to its final size. Chopping (21) may be carried out by any means known to those skilled in the art. The most preferable method for this invention is by chopper with sharp knives such as a food processor. Reducing the size of the product at this point is done to meet the desired end use, makes the product more free-flowing in the frozen state and facilitates handling of the product during packaging and food preparation. While the chopped product may be the easiest product in terms of further handling, it is contemplated that whole leaves could be processed using this system with equal success in finished product color, appearance and quality. If desired, the herbs could have been chopped to the final size prior to the infusion/blanching step. Alternatively, whole herb leaves could be infused/blanched and frozen without size reduction.

The chopped product is then held in a frozen state (22) in order to preserve finished product quality. Any method known to the artisan may be employed to reduce the temperature of the product. The temperature should be reduced rapidly to minimize any degradation to the product due to retained heat from the blanching or due to large crystal formation and concentration of the solutes. Methods may include belt freezing through a freezing chamber, freezing in liquid nitrogen, spreading the product on perforated trays and placing in a blast freezer and the like.

Herbs prepared by the method disclosed in the present invention may contain a broad range of osmotic agent concentrations. The amount of osmotic agent infused is determined by the amount of osmotic agent necessary to achieve the desired water activity coefficient. The amount of osmotic agent to be infused into a given aromatic plant to achieve the desired water activity coefficient is easily determined by those skilled in the art. The blanching/infusion solution may contain a broad range of concentrations of osmotic agent. In the case of using high fructose corn syrup as the osmotic agent, depending on the particular herb being treated, it has been determined that the osmotic agent content in the blanching/infusion solution may vary up to about 70% for HFCS, with a preferred range from about 45% to about 65% and a most preferred range from about 50% to about 65% for HFCS.

As a result of treatment which includes infusing, blanching, osmotic dehydration, accompanied with optional further partial-drying, the moisture content of the herb product will be further reduced so that the resulting water activity ($A_w$) of the preferred product, as that term is defined in U.K. Pat. No. 2,014,429 A, will be in the range of from about 0.3 to about 0.97. The effect of different water activity coefficients on the product is described below.

The finished product $A_w$ affects the properties of the frozen herb product. At an $A_w$ range of about 0.93 to about 0.97 the product is not free-flowing when frozen, but is easily thawed and broken up compared to water-blanched product. Furthermore the thawed product can be refrozen without deleterious effects such as formation of large amounts of ice crystals or freezing into a solid mass. This is in contrast to products prepared without an osmotic agent prior to freezing. Products having $A_w$ of about 0.93–0.97 are the least expensive to produce since low concentrations of the osmotic solutions are used; on the order of about 20–40% for HFCS. Table 1 provides information on $A_w$ as a function of osmotic agent and concentration for basil. The table also provides a relationship between sugar content and water content in the herb as a function of osmotic solution.

TABLE 1

Water Activity, Moisture Content, Sugar Content and Yield of Basil prepared by Blanching in Different Osmotic Agents at Different Concentrations at 200° F. for 2 Minutes

| Blanching Solution | Water Activity | % Water | % Sugar | % Yield of Fresh Leaf |
|---|---|---|---|---|
| Water | 0.995 | 89.0 | — | 78.6 |
| 10% HFCS | 0.987 | 80.3 | 2.2 | 65.6 |
| 10% Sucrose | 0.994 | 85.4 | 1.8 | 79.3 |
| 20% HFCS | 0.971 | 72.0 | 6.4 | 49.0 |
| 20% Sucrose | 0.985 | 79.0 | 4.3 | 56.9 |
| 40% HFCS | 0.932 | 51.6 | 17.1 | 28.3 |
| 40% Sucrose | 0.960 | 61.1 | 12.0 | 41.0 |
| 50% HFCS | 0.905 | 45.2 | 22.4 | 28.5 |
| 50% Sucrose | 0.940 | 49.6 | 21.2 | 33.7 |
| 60% HFCS | 0.857 | 40.5 | 26.4 | 27.6 |
| 60% Sucrose | 0.914 | 40.7 | 23.0 | 35.5 |
| 70% HFCS | 0.797 | 29.8 | 35.4 | 31.0 |

At an $A_w$ below about 0.93 the frozen herbs are free-flowing even after undergoing freeze-thaw cycles. Further, a free-flowing product is obtained using any conventional freezing process. It is not necessary to use the expensive individual quick freezing process to obtain a free-flowing frozen product. By free-flowing, it is meant that the individual herb pieces do not freeze into a single block but remain as individual discrete pieces. The precise $A_w$ which produces a free-flowing product may vary somewhat from one herb to the next. To obtain free-flowing properties with basil, a 0.93 $A_w$ value has been determined.

As the $A_w$ is further reduced the stability of the product under refrigerator and ambient temperature conditions improves. An $A_w$ below about 0.84 the product is generally pathogen-free while a $A_w$ below about 0.6 the product is microbiologically stable. That is, the microbiological stability of the herbs increases as the $A_w$ decreases to or below 0.6.

Accordingly, the range of product $A_w$ is from about 0.3 to 0.97, preferably below 0.84 if a pathogen-free product is desired, and below 0.6 if a microbiologically-stable product is desired. The minimum $A_w$ achievable in the infusion/blanch step with HFCS is about 0.8 $A_w$, thus to achieve lower $A_w$, the product must be further dried. While reduced $A_w$ produces a product more stable at room temperatures, the drying operation may cause reduced aroma and flavor properties as compared with the product which is frozen after infusion without further drying. Further drying also increases the cost of the process. Thus, a more preferred finished product water activity using HFCS as the blanching medium ranges from about 0.80 to about 0.93 $A_w$. The most preferred range of finished product $A_w$ using HFCS as the blanching medium is from about 0.85 to 0.93.

The concentration of osmotic agent in the blanching solution as well as the time of blanching should be the minimum necessary to achieve the desired $A_w$. Excessive blanching times can cause a reduction in the aroma and flavor qualities of the herb product.

The intended use of this product is as an ingredient in other food products including baked goods, salads, entrees, condiments, desserts and snacks. Because the finished product is quite comparable to fresh herbs in flavor, color and appearance, it can be used as a replacement for fresh herbs in many applications.

In the following examples water activity ($A_w$) was determined using a Decagon Model CX-2 water activity system (Decagon Devices, Inc., Pullman, Wash.). Moisture content was determined by ASTA Standard Method 2.1 (ASTA, 3rd Ed.) The fructose and dextrose content was determined by HPLC according to De-Vries et al. (AOAC V. 62, No. 6, 1979). The volatile oil content (V.O.) by steam distillation was determined according to ASTA Standard Method 16.0 (ASTA, 3rd Ed.).

The examples which follow are intended to illustrate and explain the present invention but are not intended to be limiting in any way to the subject matter of the claims.

EXAMPLE 1

A frozen, osmotically dehydrated basil product was prepared in accordance with the method described below. Approximately 100 pounds of fresh whole basil were fed lengthwise into a rotating half inch circular knife (Urschel Model J Cutter, Valparaiso, Ind. 46384, crosscut knife and stripper plate were removed). The basil leaves were thus stripped from the stems as whole leaves with minimal damage to the leaves. After cutting, the leaves were separated from the stems by air classification using a KEY 2X Air Cleaner (KEY Technology, Inc., Walla Walla, Wash.). The basil leaves were conveyed to a continuous washer where the leaves were washed in ambient temperature water to remove field dirt and reduce the microbial load. Excess water was removed from the washed leaves by centrifugation (Bock Model FP910 centrifuge) at a maximum speed of 900 RPM for 2 minutes.

The cleaned and dewatered basil leaves were submerged in a steam jacketed kettle containing 130 gallons of 0°, 40°, or 60°Brix HFCS blanching solution at 200° F. The blanching solution was stirred well to uniformly immerse the product during blanching. The product was removed from the kettle after 2 minutes and was allowed to drain for 30 seconds prior to centrifugation for 2 minutes (Bock Model FP910 centrifuge).

The product was spread on a perforated tray to a depth of one inch and cool air was blown through the product to remove the remaining heat from blanching. The product was then frozen on the trays at 0° F. with turbulent airflow. The frozen product was stored frozen in five gallon pails. The product was removed from the freezer and was finely chopped (Robot Coupe Model R4) prior to final use. The analytical results for products produced by this procedure are presented in Table 2.

TABLE 2

Analytical data for basil blanched using different concentrations of high fructose corn syrup

| Blanching Solution | Water Activity | % Moisture | % Dextrose | % Fructose | % Vol. Oil |
|---|---|---|---|---|---|
| Water | 0.994 | 86.4 | 0 | 0 | 0.04 |
| 40% HFCS | 0.945 | 55.2 | 7.4 | 6.8 | 0.11 |
| 60% HFCS | 0.857 | 39.6 | 14.2 | 12.8 | 0.16 |

These products were evaluated by a team of trained sensory evaluation experts for flavor and appearance quality. These products were compared to the fresh herb as well as commercially available frozen and shelf-stable herb products for these sensory attributes. Commercially available prepared products evaluated were frozen basil and parsley products (AFF; Armanino Farms, Fremont, Calif.); freeze-dried basil and parsley products (AFD; Armanino Farms, Fremont, Calif.); air dried basil and parsley products (MCAD; McCormick & Co., Sparks, Md.); dehydrated basil and parsley products prepared according to patent application S.N. WO 9210946; frozen, chopped basil and parsley products (DFC; Darégal BP, Milly-La-Forét, France); and basil concentrate product (PD1075I, L. J. Minor Corp., Cleveland, Ohio). Samples were evaluated in five different applications (bases). Applications included herb butter, a hot soup, hollandaise or tomato sauce, salad dressing and biscuits. The herb products were judged for flavor strength, flavor character, appearance and texture in the application based on the following scale:

1=Very weak/no herb flavor
Uncharacteristic herb flavor, not identifiable or high level of off-notes; (fermented/vegetative/pickle)
Unappealing appearance/black, brown color
Non-distinct texture from base
  4=Weak flavor strength
Characteristic flavor with predominant off-notes
Unappealing appearance/olive green, brown color
Poor texture
  6=Moderate flavor strength
Characteristic fresh flavor with some off-notes
Dark green or slightly olive
Good texture but not firm to the tooth
  10=Moderate flavor strength Bright, fresh flavor, no off-notes
Bright green
Firm identifiable texture
Scores over all applications were averaged for flavor and appearance and the data are presented in Table 3.

TABLE 3

Average of quality scores for flavor character and appearance over all applications (Abbreviations for Herb Forms are described in text).

| Herb Form | Flavor Quality | | Appearance Quality | |
|---|---|---|---|---|
| | Basil | Parsley | Basil | Parsley |
| Fresh | 9.6 | 9.2 | 7.5 | 10.0 |
| 60% HFCS | 8.4 | 7.0 | 6.6 | 7.2 |
| 40% HFCS | 6.0 | 6.2 | 6.6 | 7.2 |
| AFF | 5.8 | 5.6 | 6.6 | 7.6 |
| MCAD | 4.6 | 3.6 | 4.2 | 4.0 |
| 9210946 | 3.2 | 3.6 | 4.0 | 4.2 |
| DFC | 1.2 | 2.3 | 6.2 | 7.8 |
| AFD | 0.8 | 4.0 | 5.2 | 5.4 |
| PD1075I | 0.4 | — | 1.4 | — |

Basil and parsley processed with 60°Brix HFCS exhibited superior fresh-like flavor compared to all other basil and parsley products except fresh. The 40°Brix HFCS basil and parsley products were similar to AFF basil and parsley products and superior to all other basil and parsley products except 60°Brix and fresh. When judged for appearance, the 60° and 40°Brix HFCS basil and parsley products were closest to fresh and similar to AFF and DFC basil and parsley products.

EXAMPLE 2

A frozen, partially dehydrated basil product was prepared in accordance with the method described below. Five pounds of fresh whole basil were de-stemmed by cutting off leaves with scissors. The separated leaves, 3 pounds, had an initial moisture content of approximately 85% by weight and were blanched in 30 pounds of 10°, 20°, 40°, 50°, or 60°Brix HFCS (Isosweet 100, 42% fructose minimum, 50–52% dextrose on a dry solids basis, A. E. Staley Manufacturing Company, Decatur, Ill. 62525) or 10°, 20°, 40°, 50°, or 60°Brix sucrose (Domino sugar, Baltimore, Md.) at 200° F. for 2 minutes. Product also was prepared with no added HFCS or sucrose (water blanched) under similar time and temperature conditions. During blanching, the leaves were gently and continuously stirred to keep the leaves totally immersed and uniformly dispersed in the blanching solution. The blanched leaves were then drained for about 1 minute and then excess surface HFCS solution was removed through a strainer from the blanched leaves by mild pressure. The basil leaves were then spread on perforated trays and frozen at −30° F. This same process also was used to preserve Italian parsley. The products were analyzed for water activity, moisture content, sugar content and volatile oil content. All analytical methods were performed using standard ASTA or AOAC procedures. The analytical results of representative samples are presented in Tables 4–5. Product performance was evaluated by a team of trained sensory evaluation experts for the presence of ice crystals, ease of product flow, color and flavor character. The results are presented in Tables 6–7. Freeze-thaw stability of the products as determined by sensory evaluation is presented in Table 8.

TABLE 4

Representative analytical data for basil blanched using different concentrations of high fructose corn syrup

| Blanching Solution | Water Activity | % Moisture | % Dextrose | % Fructose | % Vol. Oil |
|---|---|---|---|---|---|
| 0% HFCS (Water) | 0.995 | 88.9 | 0 | 0 | 0.03 |
| 20% HFCS | 0.971 | 72.0 | 3.9 | 3.3 | 0.06 |
| 60% HFCS | 0.857 | 37.2 | 15.8 | 13.7 | 0.16 |

TABLE 5

Representative analytical data for parsley blanched using different concentrations of high fructose corn syrup.

| Blanching Solution | Water Activity | % Moisture | % Dextrose | % Fructose | % Vol. Oil |
|---|---|---|---|---|---|
| 0% HFCS (Water) | 0.988 | 85.5 | trace | trace | 0.07 |
| 20% HFCS | 0.966 | 74.0 | 3.3 | 2.8 | 0.10 |
| 40% HFCS | 0.934 | 58.6 | 8.0 | 6.5 | 0.13 |

For product performance testing, the samples were evaluated in the frozen state for ice crystallization, ease of product flow, and color and flavor character. The following rating scales were used:

1 = Solid block; Many ice crystals; Yellow/brown/black; dominant flavor off-notes (hay, fish, caramelized, candy, vegetative, musty).

3 = Herb easily broken-up; no ice crystals; dark green (spinach); has some fresh character with limited off-notes, flavor balance may be poor.

5 = Free Flowing; bright green; true, fresh flavor with no off-notes.

TABLE 6

Product performance characteristics of basil as determined by sensory evaluation.

| Blanching Solution | Ice/Flow | Color | Flavor Character |
|---|---|---|---|
| 0° Bx (Water) | 1 | 5 | 4 |
| 10° Bx HFCS | 2 | 5 | 3 |
| 20° Bx HFCS | 3 | 4 | 3 |
| 40° Bx HFCS | 4 | 3 | 4 |
| 50° Bx HFCS | 4.5 | 3 | 4 |
| 60° Bx HFCS | 5 | 3 | 4 |
| 10° Bx Sucrose | 1 | 5 | 4 |
| 20° Bx Sucrose | 1 | 5 | 3 |
| 40° Bx Sucrose | 3 | 3 | 4.5 |
| 50° Bx Sucrose | 4 | 3 | 4.5 |
| 60° Bx Sucrose | 4 | 2.5 | 3.5 |

TABLE 7

Product Performance Characteristics of Parsley

| Blanching Solution | Ice/Flow | Color | Flavor Character |
|---|---|---|---|
| 0° Bx (Water) | 1 | 5 | 4 |
| 10° Bx HFCS | 1 | 5 | 4 |
| 20° Bx HFCS | 2 | 5 | 4 |
| 40° Bx HFCS | 2.5 | 4 | 3.5 |
| 50° Bx HFCS | 2.5 | 3 | 2.5 |
| 60° Bx HFCS | 4 | 3 | 2 |
| 10° Bx Sucrose | 1 | 5 | 2.5 |
| 20° Bx Sucrose | 2 | 5 | 4.5 |
| 40° Bx Sucrose | 3 | 5 | 4 |
| 50° Bx Sucrose | 2 | 4 | 2 |
| 60° Bx Sucrose | 4 | 3.5 | 2.5 |

The data demonstrate that basil products made with greater than 40°Brix HFCS or 60°Brix Sucrose are free-flowing. Parsley products made with 60°Brix HFCS and Sucrose are free flowing. At lower osmotic agent concentrations, basil and parsley product flavor is less sweet and therefore the flavor character is more acceptable. However the sweetness level did not affect product performance in model applications.

Basil and parsley products were evaluated for freeze-thaw stability. The products were placed in 2 liter high density polyethylene wide mouth jars with plastic snap-on lids (100 g per jar). For comparison, commercially prepared frozen basil and parsley products (AFF; Frozen Basil and Parsley, Armanino Farms, Inc., Fremont, Calif.) were packaged in the same manner and stored under identical conditions. The samples were stored at −20° C. and removed to ambient temperature (21° C.) for 4-6 hours every 3 days within a 7 day period. The products were evaluated for pre-thaw product flow and ice crystal formation and post-thaw consistency based on the following scale:

1=Frozen hard, ice crystals cover product, wet to the touch.

3=Hard mass but will break up with little force, very small/few ice crystals, slightly damp to the touch.

5=Flows easily, no ice, dry to the touch.

TABLE 8

Flowability, ice crystallization and consistency of basil and parsley products after three freeze-thaw cycles.

| Herb | Blanching Conditions | Pre-Thaw flowability | Pre-Thaw Ice | Post-Thaw Consistency |
|---|---|---|---|---|
| Parsley | 0% (Water) | 1 | 2 | 3 |
|  | 40% HFCS | 3 | 2 | 4 |
|  | 50% HFCS | 4 | 4 | 5 |
|  | 60% HFCS | 4 | 4 | 5 |
|  | AFF | 1 | 1 | 1 |
| Basil | 0% (Water) | 1 | 1 | 2 |
|  | 40% HFCS | 3 | 4 | 4 |
|  | 50% HFCS | 3 | 4 | 5 |
|  | 60% HFCS | 5 | 5 | 5 |
|  | AFF | 1 | 1 | 1 |

After three freeze-thaw cycles, the basil and parsley products remained spoonable at −20° C. when blanched in HFCS at a concentration greater than 40°Brix. In all cases, freeze-thaw stability of the basil and parsley products is greatly improved over the commercially available frozen herb products or the water blanched herb product.

What is claimed as new and desired to be secured by Letters Patent of the United States is:

1. A process for preparing a frozen herb product comprising:

a. introducing the herb into an infusion bath comprising 10 to 70% by weight of an osmotic agent at a temperature of at least about 180° F. for a time sufficient to reduce the water activity coefficient of the herb to below about 0.97 and cause infusion of the osmotic agent into the herb; and b. subsequently freezing the infused herb.

2. The process of claim 1 wherein the osmotic agent is selected from the group consisting of high fructose corn syrup, sucrose, glucose, maltose and hydrogenated corn syrup.

3. The process of claim 1 wherein the osmotic agent is selected from the group consisting of corn syrup having a D.E. above about 62, glucose, fructose, sucrose and mixtures thereof.

4. The process of claim 1 wherein the osmotic agent is high fructose corn syrup.

5. The process of claim 1 wherein after the osmotic agent has been infused into the herb, the herb is subjected to an additional drying step before the infused herb is frozen.

6. The process of claim 1, wherein said temperature of said infusion bath is from about 180° F. to about 225° F.

7. The process of claim 1, wherein said temperature of said infusion bath is from about 190° F. to about 210° F.

8. The process of claim 1, wherein said infusion bath comprises 40 to 70% by weight of said osmotic agent.

9. The process of claim 1, wherein said infusion bath comprises 50 to 70% by weight of said osmotic agent.

10. The process of claim 1, wherein said herb is selected from the group consisting of basil, dill weed, parsley, oregano, marjoram, sage, thyme, rosemary, mint, cilantro, tarragon, chervil, and genetic variations thereof.

11. The process of claim 1, wherein said herb is selected from the group consisting of basil, cilantro, and mint.

12. The process of claim 1, wherein said herb is basil.

13. The process of claim 1, wherein said herb is cilantro.

14. The process of claim 1, wherein said herb is mint.

15. The process of claim 1, wherein said time in the introducing step is from 20 seconds to 10 minutes.

16. The process of claim 1, wherein said time in the introducing step is from about 2 minutes to about 5 minutes.

* * * * *